(12) United States Patent
Zehfuss

(10) Patent No.: US 11,498,601 B2
(45) Date of Patent: Nov. 15, 2022

(54) WAGON FOR CARRYING CHILDREN

(71) Applicant: Dynamic Motion, LLC, Richmond, VA (US)

(72) Inventor: Mark Zehfuss, Glen Allen, VA (US)

(73) Assignee: DYNAMIC MOTION, LLC, Richmond, VA (US)

( * ) Notice: Subject to any disclaimer, the term of this patent is extended or adjusted under 35 U.S.C. 154(b) by 8 days.

(21) Appl. No.: 16/820,977

(22) Filed: Mar. 17, 2020

(65) Prior Publication Data

US 2021/0291886 A1    Sep. 23, 2021

(51) Int. Cl.
| | |
|---|---|
| *B62B 7/08* | (2006.01) |
| *B62B 9/10* | (2006.01) |
| *B62B 9/14* | (2006.01) |
| *B62B 7/00* | (2006.01) |
| *B62B 9/20* | (2006.01) |

(52) U.S. Cl.
CPC ............... *B62B 7/08* (2013.01); *B62B 7/008* (2013.01); *B62B 9/104* (2013.01); *B62B 9/142* (2013.01); *B62B 9/20* (2013.01); *B62B 2205/06* (2013.01)

(58) Field of Classification Search
CPC .......... B62B 7/08; B62B 7/008; B62B 9/104; B62B 9/142; B62B 9/20; B62B 2205/06
See application file for complete search history.

(56) References Cited

U.S. PATENT DOCUMENTS

| | | | |
|---|---|---|---|
| D379,165 S | 5/1997 | Marozza et al. | |
| 6,845,991 B1 | 1/2005 | Ritucci et al. | |
| 8,388,015 B2 | 3/2013 | Chen | |
| 9,085,311 B1 | 7/2015 | Chen | |
| 9,623,890 B1* | 4/2017 | Horowitz | B62B 3/007 |
| 9,950,729 B2* | 4/2018 | Choi | B62B 3/007 |
| 10,040,470 B1* | 8/2018 | Horowitz | B62B 3/102 |
| 10,988,153 B1* | 4/2021 | Horowitz | B62B 7/008 |
| 11,225,277 B1* | 1/2022 | Sun | B62B 3/002 |
| 2007/0284900 A1 | 12/2007 | Sze | |
| 2010/0090444 A1* | 4/2010 | Chen | B62B 3/106 |
| | | | 280/651 |
| 2010/0156069 A1* | 6/2010 | Chen | B62B 9/142 |
| | | | 280/639 |
| 2016/0347338 A1* | 12/2016 | Vargas, II | B62B 3/02 |
| 2018/0057035 A1* | 3/2018 | Choi | B62B 9/26 |
| 2018/0170418 A1* | 6/2018 | Choi | C08L 63/00 |
| 2018/0297622 A1* | 10/2018 | Chen | B62B 3/007 |
| 2021/0291886 A1* | 9/2021 | Zehfuss | B62B 9/14 |

* cited by examiner

*Primary Examiner* — Erez Gurari
(74) *Attorney, Agent, or Firm* — Pike IP Law; Bernard G. Pike

(57) ABSTRACT

A folding wagon with a footwell for carrying small children or other articles. The folding wagon has a solid frame with scissor connections, that allow it to be compacted for storage and expanded for use. The footwell allows children a place to rest their feet within the wagon. The folding wagon has a fabric paneling system, from which portions can be removed for the cleaning of the wagon and the footwell. The folding wagon also has two canopies, allowing the carrying of two children with the canopies protecting them from the sun or the elements. The folding wagon can use attachments that expand its capabilities.

7 Claims, 8 Drawing Sheets

WAGON FOR CARRYING CHILDREN

FIELD OF THE INVENTION

A foldable wagon may be capable of being folded from an expanded in-use configuration for carrying small children and/or other articles to a compact storage configuration for the storage or transport of the wagon when it is not in-use and unfolded from the storage or transport configuration to the in-use configuration. The foldable wagon may comprise a footrest defined by an aperture in the bottom floor of the frame and/or cover of the wagon. The footrest would allow children riding in the wagon to sit comfortably with their feet extending into the footwell.

The foldable wagon may further comprise at least one reclining seat back. The reclining seat backs may be located on at least one end of the wagon and allow a child sitting on the floor of the wagon to recline to ride more comfortably or sleep in the wagon. Embodiments of the foldable wagon may comprise either a footwell and at least one reclining seat or just one of these features. The reclining seatback may comprise a seatback frame pivotally connected to the bottom frame or other component of the wagon frame and a fabric cover over the seatback frame. The fabric cover is attached to the frame such that a child can support their back on the seatback fabric cover.

Additionally, the foldable wagon may comprise a frame and a fabric cover supported over the frame to define the wagon features and structure. The fabric cover may comprise a footrest cover providing a reclosable opening in the bottom floor of the wagon to provide a complete wagon floor by covering the footrest. The fabric cover defining the footwell may further comprise an opening with a closure mechanism to allow easy maintenance and cleaning of the wagon cargo section and the footwell.

The wagon may also comprise accessory connectors to allow connecting at least one of canopies, sunshades, a cooler, a tabletop, or mosquito netting to the wagon. The wagon may comprise four accessory connectors and, in some embodiments, the accessory connectors may be located at each corner of the wagon.

BACKGROUND

Wagons have a cargo space or bed that may be used to carry articles, groceries, children, and other supplies, for example. Typically, a wagon comprises a wagon bed defined by a fabric cover having a floor and side panels, at least one handle, and four wheels. Some conventional wagons may be folded from an open in-use configuration to collapsed storage configuration. Such folding wagons may have a fabric basket capable of carrying a variety of articles and/or children when the wagon is unfolded for use in its in-use configuration.

A folding wagon is described in U.S. Pat. No. 5,957,482 filed Aug. 30, 1996, for example. The wagon may be folded from a flat position for use to a position which the two bed halves are in face-to-face contact for storage. Furthermore, the removable rail modules may be removable for storage.

None of the folding wagons provide comfortable modifications of a cargo wagon for carrying at least one child. There is a need for a folding wagon comprising at least one reclining seat back to allow a child to be more comfortably carried. There is also a need for a folding wagon comprising a footwell to allow the child sit more naturally. There is a still further need for such a stroller to have two seats with reclining seat backs with two removable sunshades, one over each seat.

SUMMARY OF THE INVENTION

Embodiments of a wagon or a foldable wagon may comprise comfort and convenience modifications for carrying children and/or other articles. The comfort modifications may include at least one reclining seat, a footwell, accessory connectors, and/or individual sunshades on each end of the wagon with two seats. Embodiments of wagon comprise a frame, wherein the frame may be a foldable frame. For example, the foldable wagon may comprise scissoring side frames that may be expanded to convert the wagon to an in-use configuration and be compressed to convert the wagon to a storage configuration. Other wagons incorporating these features may have a rigid, non-folding structure.

The frame may further comprise a bottom support frame, wherein the bottom support frame comprises a plurality of bottom frame members and the plurality of bottom frame members define a footwell aperture. The footwell aperture may be adjacent to seat support frame members so that a child may sit on the seat support frame and may lower their feet through the footwell aperture and rest them on the bottom surface or the fabric cover of the footwell.

The wagon frame may comprise left and right frames, front and rear frames, and the bottom frame. The left frame and the right frame may be foldable frames such as, but not limited to, scissoring folding frames. Scissoring folding frames allow the side the length of the side frame to be reduced as the individual frame member rotate relative to each other. The wagon may comprise a fabric cover supported over the frame to define the wagon features such as, but not limited to, the walls and floor and, optionally, a footwell and/or a reclining seatback of the wagon. The fabric cover may further comprise a footwell cover that extends over the footwell aperture and connects to the fabric cover defining the floor of the wagon. The fabric cover may comprise several panels that cover the frame and define a cargo volume in the wagon. The fabric cover may further comprise at least one individual panel that extends over the reclining seat frames to provide support for the child sitting or lying in the wagon's cargo volume.

Additionally, the fabric cover may comprise the footwell side walls panels and footwell bottom panel defining the footwell inner volume. In some embodiments, the fabric cover may further comprise a footwell closing panel that extends over the footwell aperture and covers the footwell inner volume. The footwell closing panel may be part of a reclosable opening to the footwell inner volume and may be connected to the footwell bottom panel and, optionally, to the fabric cover side panels. The footwell may be opened or closed as desired for use of the wagon.

In order to support the footwell bottom panel, a footwell support member may be connected to the bottom frame member. The footwell support member may extend from the bottom support frame, below the footwell aperture in the frame with the wagon in an in-use configuration. The footwell support frame may be rotatably connected to the bottom frame. In embodiments wherein the bottom frame comprises two hingedly connected sections rotatable at a bottom frame pivot axis, the footwell support member may be U-shaped (or other appropriate shape) and also connected to the bottom frame pivot axis.

The wagon frame may further comprise upper accessory connectors. The upper accessory connectors may be on top of corner wagon support post, on the top of the scissor frame end frames, or other appropriate portions of the frame. The accessory connectors may be used to connect individual sunshades to one or both ends of the wagon to provide protection from sun, rain, and/or wind to a child in the reclining seats. In embodiments with four accessory connectors (one at each corner of the wagon frame, for example), one canopy may comprise four connectors capable of connecting to the accessory connectors to provide protection to the substantially the entire cargo inner volume. Other accessories may be attached. The accessories include, but are not limited to, a food/drink cooler, a table surface, drink holders, umbrella holder, adult seat, cell phone holder, combinations thereof, or other desired accessories.

Aspects of the stroller are presented in various embodiments, however one skilled in the art will understand various variation and interchangeability of the components of the various embodiments which are intended to be included in the scope of the invention.

DETAILED DESCRIPTION

Figure 1:
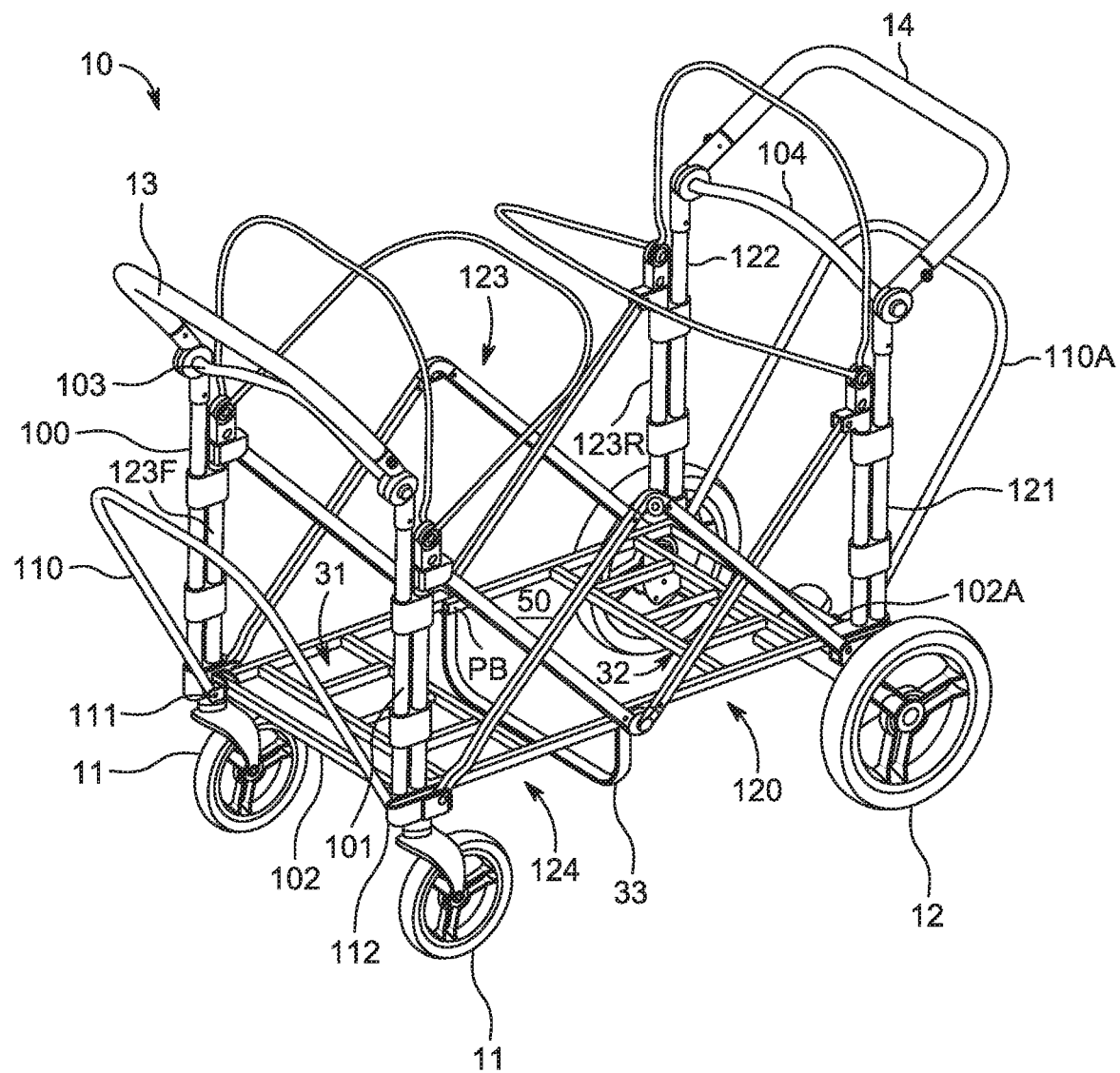
FIG. 1 is a perspective view of the present invention in the open/in-use configuration with two individual canopies attached to the accessory connections.

Embodiments of a wagon with a folding frame 1 and fabric covers components mounted on the folding frame 1 are known in the art using conventional techniques in the art such as making a sleeve to receive the frame components, use of grommets, hook and loop connectors, stitching, or other connectors.

Embodiments of a wagon or a foldable wagon may comprise comfort and convenience modifications for carrying children and/or other articles. The comfort modifications may include at least one reclining seat that may be moved from an upright position to a reclined position, a footwell in the bottom surface or floor of the wagon adjacent to the seats, accessory connectors for attaching different devices to the wagon, and/or individual sunshades that may be attached to the accessory connectors on each end of the wagon with two seats.

Embodiments of wagon comprise a frame, wherein the frame may be a foldable frame or a rigid frame. For example, the foldable wagon with a foldable frame may comprise scissoring side frames that may be expanded to convert the wagon to an in-use configuration and be compressed to convert the wagon to a storage configuration. Other wagons incorporating these features may have a rigid, non-folding structure.

The frame may comprise a bottom support frame wherein the bottom support frame comprises a plurality of bottom frame members and, in some embodiments, the bottom frame members may comprise a plurality of bottom frame members that define a footwell aperture. The footwell aperture may be adjacent to a seat support frame comprising seat support frame members so that a child may sit on the seat support frame members and may lower or rest their feet through a footwell aperture and rest them on the bottom surface or the fabric cover of the footwell on a footwell bottom surface.

The wagon frame may also comprise left and right frames, front and rear frames, and the bottom frame. The left frame and the right frame may be foldable frames such as, but not limited to, scissoring folding frames. Scissoring folding frames allow the side the length of the side frame to be reduced as the individual frame member rotate relative to each other. The wagon may comprise a fabric cover supported over the frame to define the wagon features such as, but not limited to, front wall, rear wall, left wall, right wall and floor and, optionally, a footwell and/or a reclining seatback of the wagon. The fabric cover may further comprise a footwell cover that extends over the footwell aperture and connects to the fabric cover defining the floor of the wagon. The footwell cover when connected over the footwell aperture defines a portion of the wagon floor.

The fabric cover over the wagon may comprise several panels that cover the frame and define a cargo volume in the wagon. The fabric cover may further comprise at least one individual panel that extends over the reclining seat frames to provide support for the child sitting or lying in the wagon's cargo volume.

Additionally, the fabric cover may comprise the footwell side walls panels and footwell bottom panel defining the footwell inner volume. In some embodiments, the fabric cover may further comprise a footwell closing panel that extends over the footwell aperture and covers the footwell inner volume. The footwell closing panel may be part of a reclosable opening to the footwell inner volume and may be connected to the footwell bottom panel and, optionally, to the fabric cover side panels. The footwell may be opened or closed as desired for use of the wagon.

In order to support the footwell bottom panel, a footwell support member may be connected to the bottom frame member. The footwell support member may extend from the bottom support frame, below the footwell aperture in the frame with the wagon in an in-use configuration. The footwell support frame may be rotatably connected to the bottom frame. In embodiments wherein the bottom frame comprises two hingedly connected sections rotatable at a bottom frame pivot axis, the footwell support member may be U-shaped (or other appropriate shape) and also connected to the bottom frame pivot axis.

The wagon frame may further comprise upper accessory connectors. The upper accessory connectors may be on top of corner wagon support post, on the top of the scissor frame end frames, or other appropriate portions of the frame. The accessory connectors may be used to connect individual sunshades to one or both ends of the wagon to provide protection from sun, rain, and/or wind to a child in the reclining seats. In embodiments with four accessory connectors (one at each corner of the wagon frame, for example), one canopy may comprise four connectors capable of connecting to the accessory connectors to provide protection to the substantially the entire cargo inner volume. Other accessories may be attached. The accessories include, but are not limited to, a food/drink cooler, a table surface, drink holders, umbrella holder, adult seat, cell phone holder, combinations thereof, or other desired accessories.

With the folding wagon 10, as seen in FIG. 1, the front wheels 11 are spaced apart from the rear wheels 12; the wagon is in an in-use configuration. The in-use configuration is the configuration, shown in FIG. 1, and further elaborated on later in the detailed description because it allows for clearer specification of the invention. In storage configuration, the front wheels 11 and the rear wheels 12 are adjacent each other, as the side frames 200 and 201 are contracted to that position.

In one embodiment, the folding wagon 10 has a folding frame 1 that may be converted from an in-use configuration (shown in FIG. 1) to a storage configuration. In the embodiment shown in FIG. 1 (and other figures), the folding frame 1 comprises a right front support frame 100, a left front support frame 101, a right rear support frame 122, left rear support frame 121. A front upper horizontal support 103 extends between the right front support frame 100, and the left front support frame 101. Similarly, a rear upper horizontal support 104 extends between the right rear support frame 122 and the left rear support frame 121. The front upper horizontal support 103 or the rear upper horizontal support 104 may be converted into a handle or the wagon 10 may have additional handles, such as front handle 13 and/or rear handle 14. In one embodiment, the front support frames 100 and 101 may be connected by a front lower horizontal support 102 for added support. Similarly, the rear support frames 121 and 122 may be connected by a rear lower horizontal support 102A for the same purpose.

The front handle 13 and/or rear handle 14 may be removably connected to the wagon frame. As used herein, the term "removably connected" means that the handle may be removed by the user without the use of tools and/or without permanently damaging the wagon frame and the handle may be reconnected resulting in the same configuration.

The embodiment of the wagon in the figures comprises at least one reclining seatback frame 110 and/or 110A. In the embodiment shown in FIG. 1, the front seatback frame 110 is rotatably connected to the right front support frame 100 and the left front support frame 101 via two connectors 111 and 112. The seatback frame 110 is shown to be rotatably connected to front left bottom frame bottom connector 112 and front right bottom frame bottom connector 111. In this embodiment, the front right bottom frame bottom connector 111 also connects the right front support frame 100, the right side frame 200 and the bottom frame 120, and the left front support frame 101. The right side frame 200 comprises a front telescoping post 123F and a rear telescoping post 123R. Each telescoping post comprises a hollow vertical support and the telescopic extensions within the hollow vertical supports. The vertical supports may be made of metal tubing having a circular, square, rectangular or other appropriate shaped cross-section. The vertical supports may additionally have a telescopic bushing, which is an insert, preferably made of plastic, which generally permits the telescoping movement when the front telescopic post 123F and the rear telescoping post 123R are moved toward each other during the folding of the wagon. The side frames 200 and 201 may be scissor frames to allow folding, when the telescoping posts 123F and 123R are biased toward one another, the telescoping posts must extend by sliding the telescopic extension out of the hollow vertical support.

The bottom frame 120 comprises two hingedly connected bottom frame sections, a front bottom frame 124 and a rear bottom frame 125. The front bottom frame 124 and the rear bottom frame 125 are hingedly connected at a bottom frame pivot axis $P_B$. The front bottom frame 124 comprises a front seat support frame 31. The rear bottom frame 125 comprises a rear seat support frame 32. The seat support frames may comprise one or more frame members or the seat support frames may comprise a panel for supporting the child.

In one embodiment, the front and rear bottom frames 124 and 125 define a footwell aperture 50. The footwell aperture 50 is adjacent to seat support frames 31 and 32 so that a child may sit on the seat support frame and may lower their feet through the footwell aperture 50 and rest them on the footwell bottom panel 51 or the fabric footwell cover 52 shown in FIG. 2.

Figure 2:
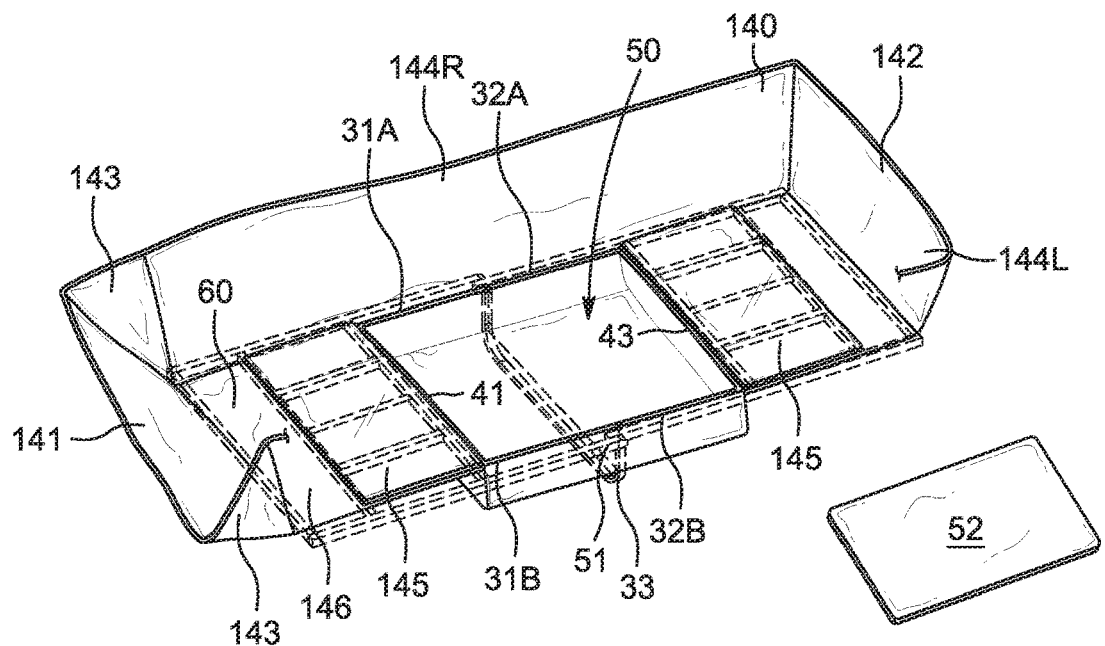
FIG. 2 is a partial perspective view of the panel placement and fabric cover placement of an embodiment of a wagon comprising a footwell and reclining seats in the in-use configuration.
Figure 3:
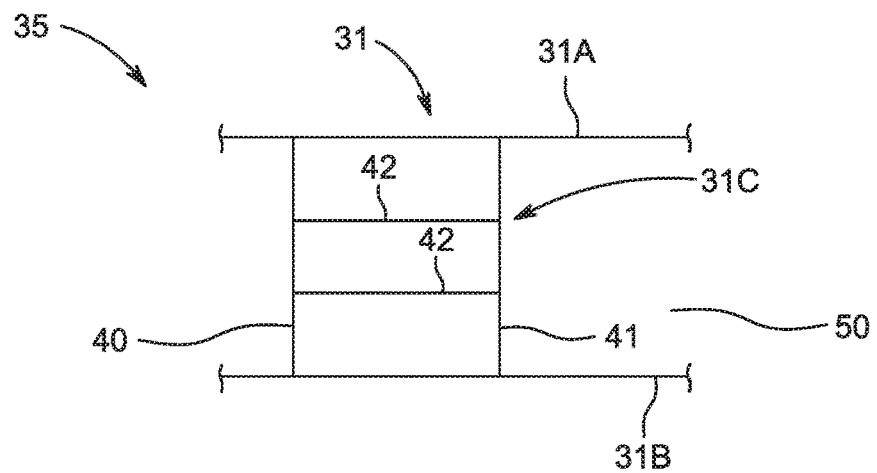
FIG. 3 is a plan view of one side of a bottom frame for an embodiment of the wagon comprising a seat frame and a frame defining a footwell aperture.
Figure 4:
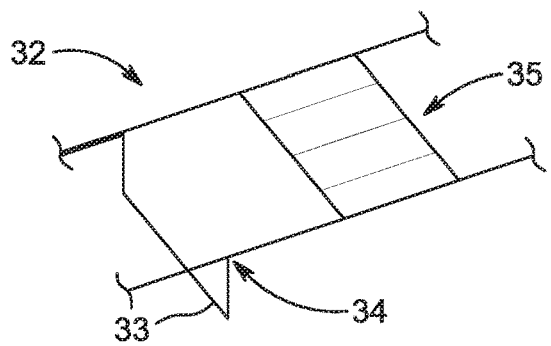
FIG. 4 is a perspective view of one side of a bottom frame for an embodiment of the wagon comprising a seat frame, a u-shaped footwell support member connected at a pivot point of the folding bottom frame, and a frame defining a footwell aperture.
Figure 5:
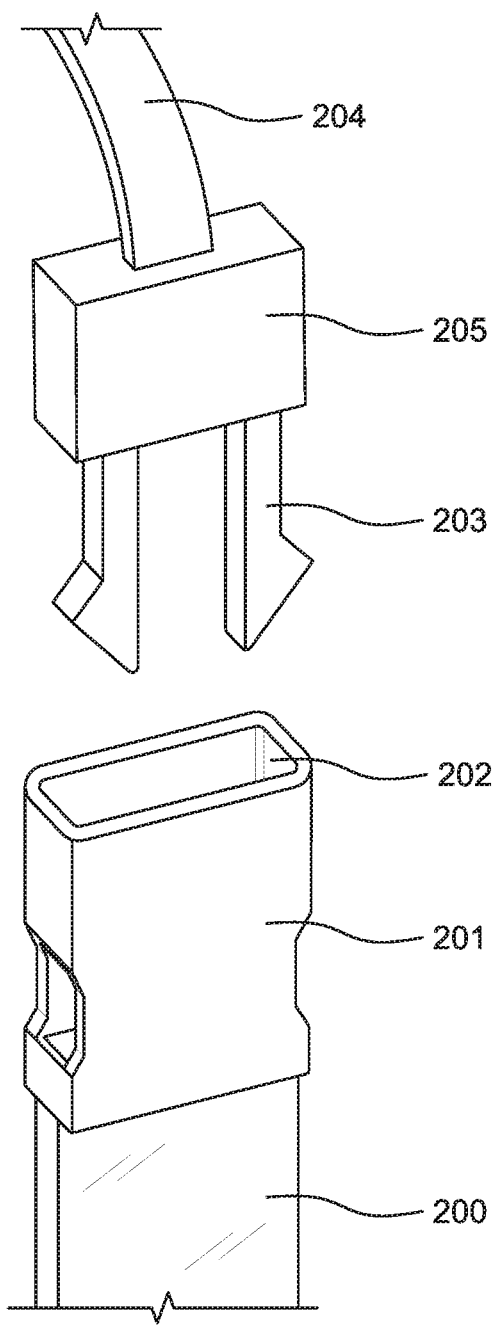
FIG. 5 depicts an embodiment of an accessory connector comprising a two pronged tab and a receiving recess for the tab.
Figure 6:
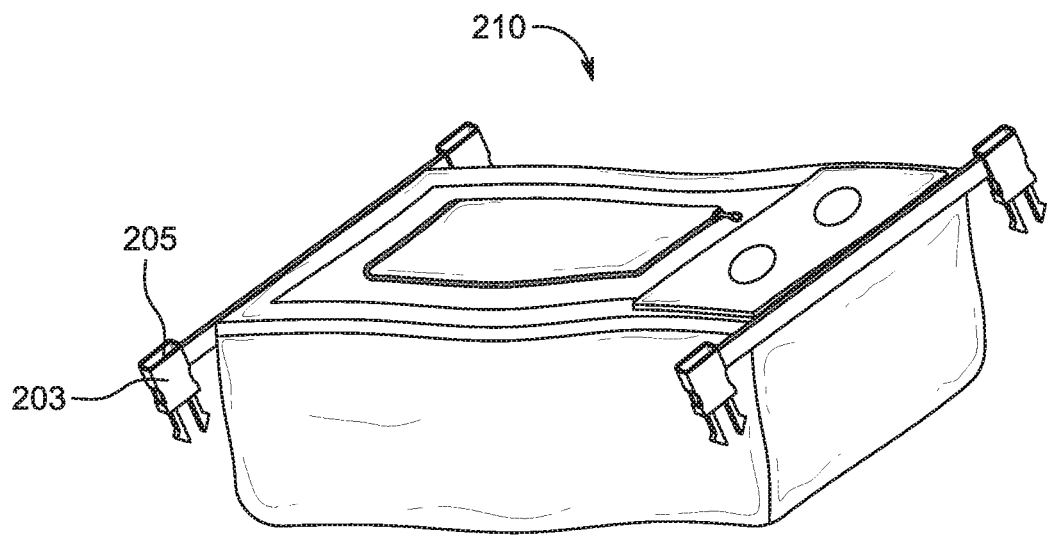
FIG. 6 depicts a cooler basket accessory for connecting to the accessory connections on an embodiment of the wagon shown in FIG. 1.
Figure 7:
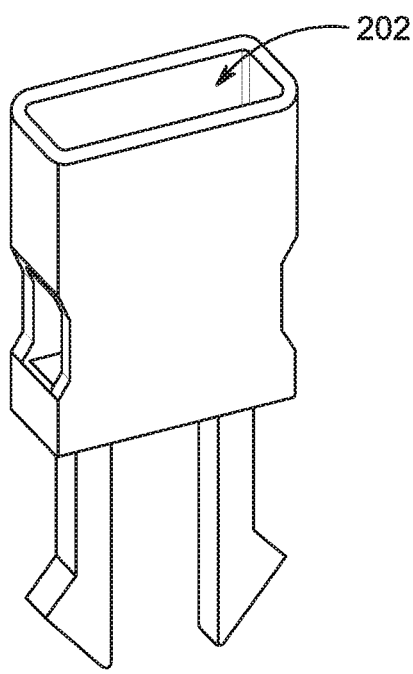
FIG. 7 depicts an embodiment of a dual accessory connector that comprises a tab on the bottom for connecting to accessory connectors such as those shown on the wagon of FIG. 1 and also comprising a recess to receive the tab of another accessory such as a canopy for example, an accessory may comprise these dual connectors.
Figure 8:
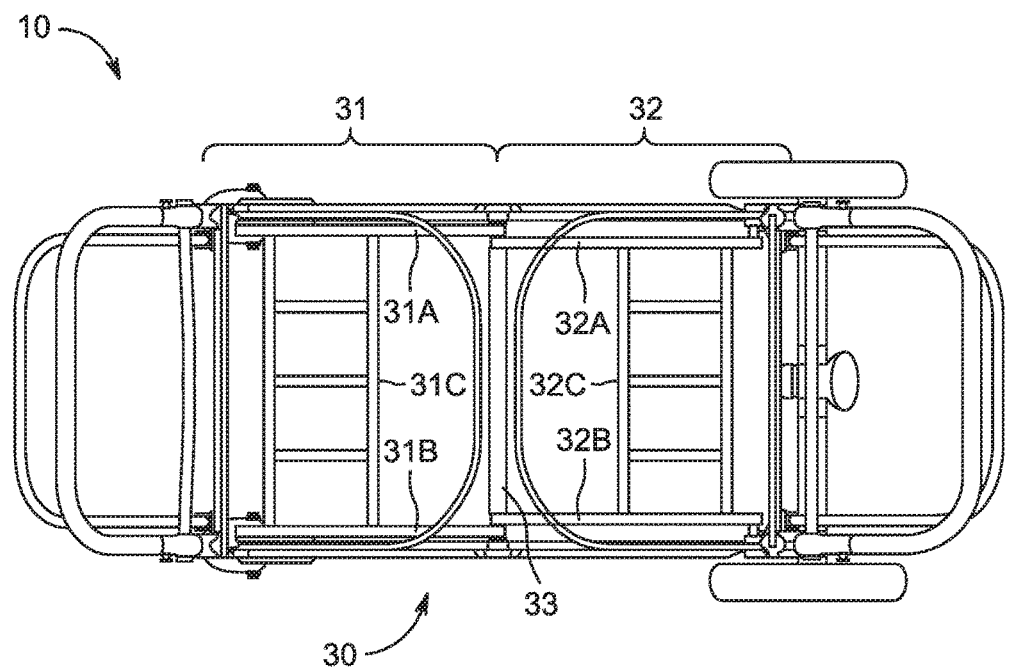
FIG. 8 depicts a plan view of an embodiment of the foldable wagon.
Figure 9:
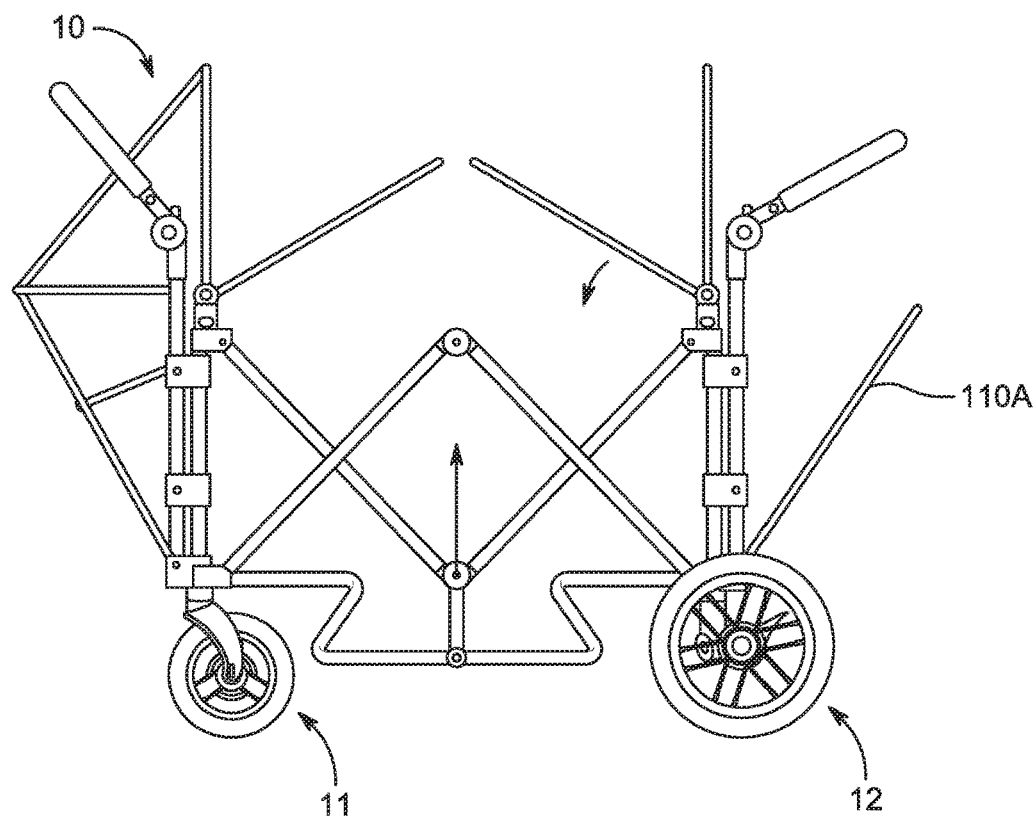
FIG. 9 depicts an elevation view of an embodiment of the foldable wagon of FIG. 8 wherein the wagon comprises a footwell cover defining a trapezoidal cross-section shaped footwell and an embodiment of an adjustment mechanism for the reclining seat.
Figure 10:
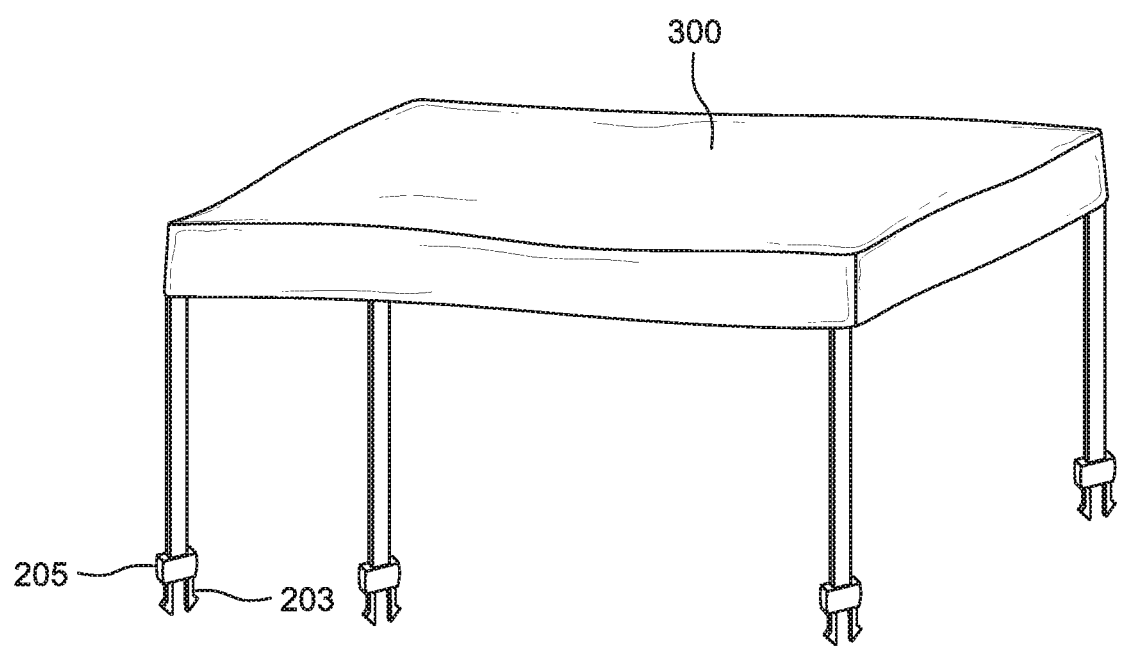
FIG. 10 depicts a canopy accessory that may be connected to the accessory connections on the embodiment of the wagon shown in FIG. 1 or to the dual accessory connections shown in FIG. 7 that may be incorporated into the cooler basket accessory shown in FIG. 6, for example.

An embodiment of the fabric cover 140 fitted over the frame 1 is shown in FIG. 2. The fabric cover 140 comprises a plurality of panels that define the walls of the wagon 10. A suitable material for a panel is defined as a fabric, woven or rigid material. An example of a suitable material is 900D polyester fabric. A panel is not necessarily a separate fabric panel that is sewn together but two or more panels may be made of one single sheet of fabric. The fabric cover 140 comprises a right side panel 144R that extends from the front of the wagon to the rear of the wagon. Similarly, the fabric cover 140 comprises a left side panel 144L. Further, the fabric cover 140 comprises a front reclining seat panel 141. The front reclining seat panel 141 may be connected to a bottom panel 145. The bottom panel 145 may comprise multiple panels, especially in an embodiment comprising a footwell aperture 50. The bottom panel may comprise three panels as shown in FIG. 2; the bottom panel may comprise a front bottom panel 146, a footwell bottom panel 51, and a rear bottom panel 147. The footwell bottom panel 51 is on a footwell plane, lower than the seating plane which comprises at least one of the front bottom panel 146 and the rear bottom panel 147.

In some embodiments, the right side panel 144R is connected to the front reclining seat panel 141 by a reclining seat side panel 143. The left side panel 114L may also be connected to the front reclining seat panel 141 by a reclining seat side panel 143. The reclining seat side panels 143 are shown only on the front but may be incorporated in either a front reclining seat panel 141, the rear reclining seat panel 142, or on both panels. In embodiments where the wagon does not comprise any reclining seats but instead comprises at least one fixed seat, the reclining seat panels 141 and 142 would be fixed seat panels and would be connected to the side panels 144R and 144L, without the need for a reclining seat side panel.

Figure 13:
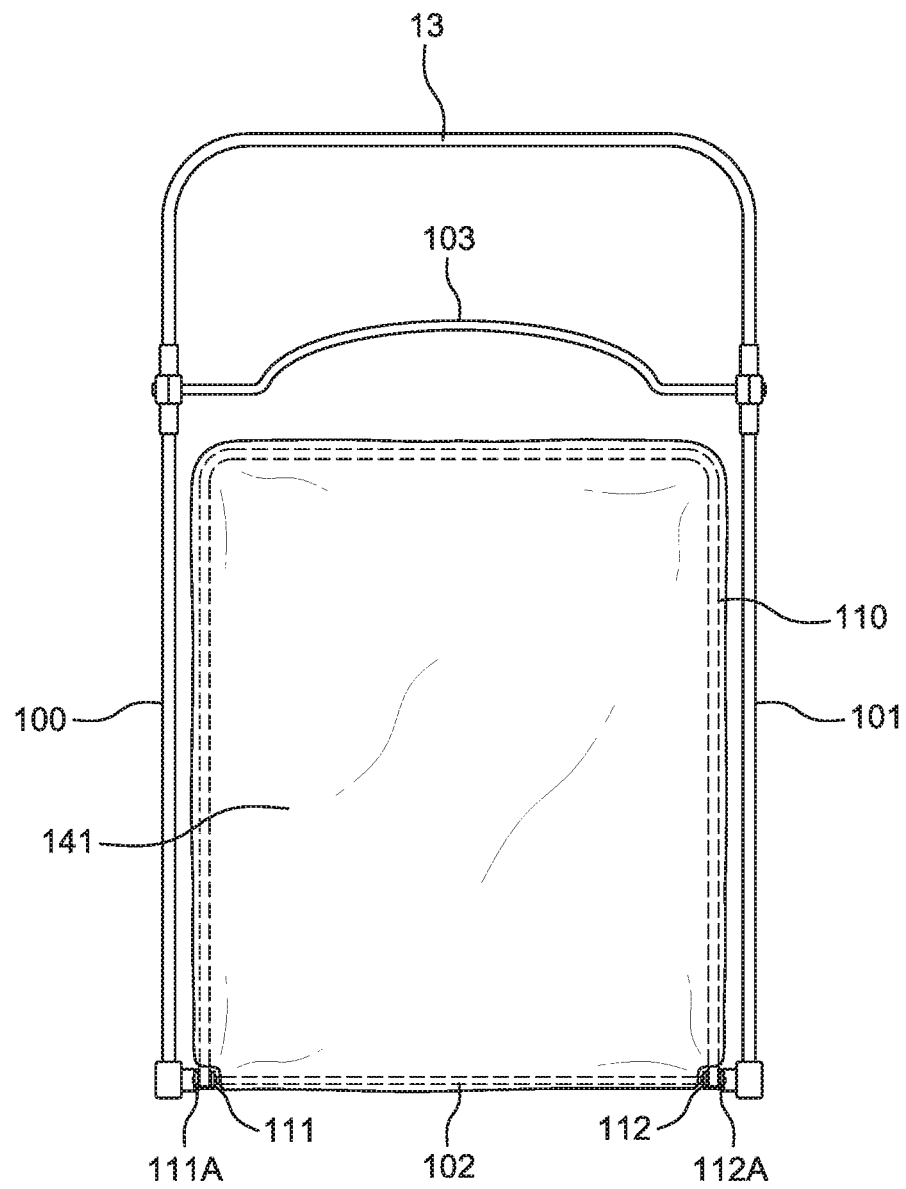
FIG. 13 depicts an embodiment of a reclining seat for a wagon for carrying at least one child.

An embodiment of a reclining seat is shown in FIG. 13. This embodiment of the reclining seat comprises a reclining seatback frame 110. In the embodiment shown in FIG. 13, the front seatback frame 110 is rotatably connected to the right front support frame 100 and the left front support frame 101 via two connectors 111 and 112. The two connectors 111 and 112 comprise a connector component and a pin 111A and 112A. The seatback frame 110 is shown to be rotatably connected to front left bottom frame bottom connector 112 and front right bottom frame bottom connector 111 by pins 111A and 112A. The pins define the axis of rotation of the reclining seat back.

The reclining seat back comprises a seat cover 141 that is connected over or otherwise to the reclining seat back frame 110. The seat back cover 141 provides support for the child resting in the reclining position, for example, and a portion of the walls that defines the wagon inner volume.

As further shown in FIG. 13, the front upper horizontal support 103 and/or the rear upper horizontal support 104 provide horizontal support for the right front support frame 100 and the left front support frame 101. This upper support provides structural support to the frame and allows a reclining seat to freely rotate under the horizontal support 103. The horizontal support 103 may be positioned high enough to allow a child to move to and from the reclining position without contacting the upper horizontal support 103 and/or the upper horizontal support may comprise a curved or otherwise raised middle section to allow more head room for the child to move under the upper horizontal support 103. In some embodiments, the front upper horizontal support 103 and/or the rear upper horizontal support 104 may be at least partially U-shaped, V-shaped, channel shaped, straight, or otherwise curved upwards to provide the head space.

As shown in FIGS. 1 and 2, the frame 1 may comprise a footwell support member 33. The footwell support member 33 provides support for the footwell bottom panel 51. The footwell support member 33 may be a combination of frame members or a single frame member such as, but not limited to, a U-shaped, channel shaped, or other appropriate shape and connected to the bottom frame, such as at the bottom frame pivot axis $P_B$. The footwell bottom panel 51 may be partially or fully removable from the bottom panel 145 either via a zipper mechanism or by another mechanism, allowing for easier cleaning of the footwell panel. Similarly, the fabric footwell cover 52 may be partially or fully removable from the top of the footwell aperture 50 either via a zipper mechanism or by another mechanism; this feature allows a larger child to rest his feet in the footwell aperture 50 when the fabric footwell cover 52 is removed, or allows for the footwell aperture 50 to be used to storage when the fabric footwell cover 52 is attached.

One embodiment of the wagon comprises front and rear telescoping posts 123F and 123R which have attachment mechanisms 190 on the top. These attachment mechanisms 190 rest on top of each telescoping post 123F and 123R, on the four corners of the wagon. The attachment mechanisms 190 may be plug and socket style, buckle style, or another style of attachment mechanism. The attachment mechanisms 190 may be attached to various accessories that may be partially or fully removed from the folding wagon 10. One accessory which may be attached to the folding wagon 10 is a cooler 195, which may comprise a plurality of pockets or cup-holders for beverage temperature control or storage use. The cooler 195 may be attached or removed from the telescoping posts 123F and 123R using the attachment mechanisms 190. Another accessory which may be attached to the folding wagon 10 is a full canopy 196. The full canopy 196 is comprised of two or more vertical-pointing or diagonal-pointing frames with a suitable canopy material on top. This full canopy 196 may fully or partially cover the frame 1, and like the cooler 195 it may be attached and removed via the attachment mechanisms 190. In one embodiment of the wagon, the full canopy 196 may cover the entirety of the frame and comprise a bug netting or other similar netting around the perimeter of the canopy which extends down the wagon. The embodiment of the folding wagon with the full canopy 196 comprising a bug netting may be useful when the wagon is used to transport children, as in a stroller, and the wagon is used outdoors where insects and/or bugs are present and pose a danger to the children.

Another accessory which may be attached to the folding wagon 10 is a dual canopy system 197, comprising two canopies, one on the front and one on the rear: each being attached to its respective telescoping posts 123F and 123R. The dual canopy system 197, like the cooler 195 and full canopy 196 this accessory may be attached and removed via the attachment mechanisms 190. The dual canopy system 197 is comprised of, on each the front and rear end: one or more vertical-pointing or diagonal-pointing frames with any suitable canopy material on top. The dual canopy system 197 may cover half or a substantial portion of half of the frame 1 with the portion of the dual canopy system 197 which is attached to the front telescoping posts 123F. The dual canopy system 197 may cover half or a substantial portion of half of the frame 1 with the portion of the dual canopy system 197 which is attached to the rear telescoping posts 123R. The dual canopy system 197 may be partially removed, by only removing the attachments on either the front telescoping posts 123F or rear telescoping posts 123R. The dual canopy system may be useful when transporting children with the wagon, as in a dual-stroller, and the children can enjoy protection from the sun and/or elements.

In one embodiment of the wagon, the attachment mechanisms 190 may be connected to the front upper horizontal support 103 and/or the rear upper horizontal support 104, rather than the front and rear telescoping posts 123F and 123R. This embodiment would allow the attachment and removal of the previously described accessories via the attachment mechanisms 190 in substantially the same manner.

In one embodiment of the wagon, the attachment mechanisms 190 may be connected to the left and right front support frames 101 and 100 and/or the left and right rear support frames 121 and 122, rather than the front and rear telescoping posts 123F and 123R. This embodiment would allow the attachment and removal of the previously described accessories via the attachment mechanisms 190 in substantially the same manner.

In other embodiments of the wagon, the attachment mechanisms 190 may be used with other accessories and/or on various parts of the frame 1, These other accessories include but are not limited to: a table surface, drink holders, umbrella holder, cell phone holder, and combinations thereof. These other accessories may also be attached to various part of the frame directly without the use of the attachment mechanisms 190.

Figure 11:
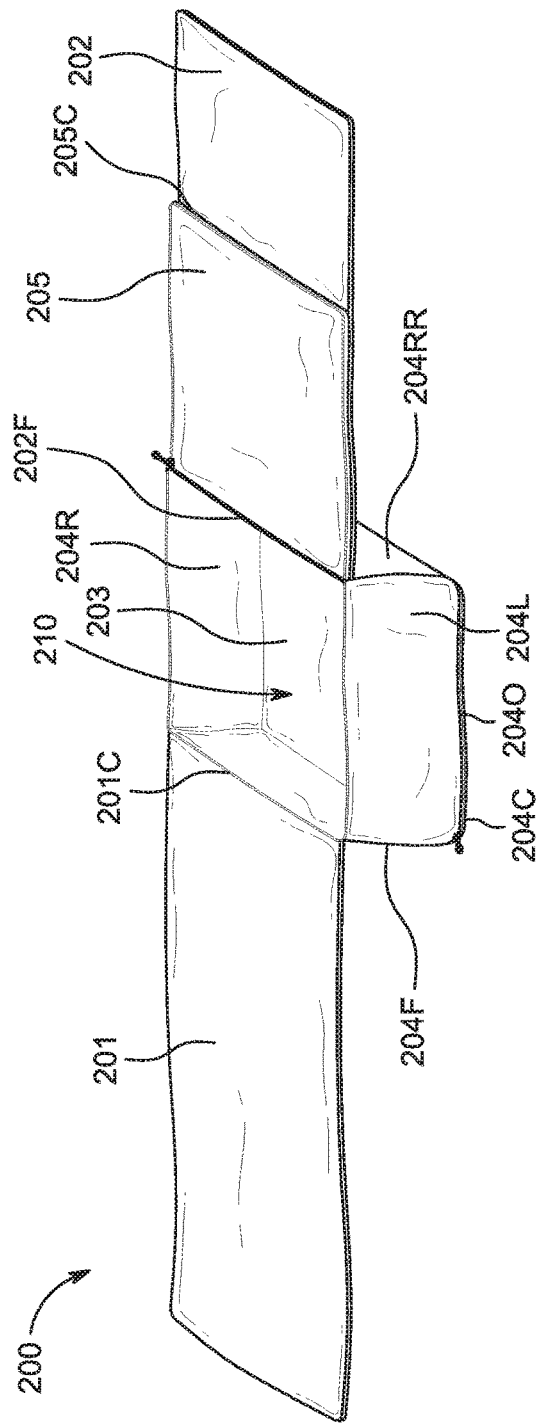
FIG. 11 depicts an embodiment of a footwell for a wagon for carrying at least one child.

FIG. 11 depicts an embodiment of the bottom of the wagon of FIG. 1. The bottom of the wagon comprises a bottom floor 200 over the bottom frame (see FIG. 1). The bottom floor 200 comprises a front bottom panel 201 and a rear bottom panel 202, and a footwell bottom panel 203. In the embodiment shown in FIG. 11, the footwell comprises the footwell bottom panel 203, a footwell front panel 204F, a footwell rear panel 204RR, a footwell left panel 204L, and a footwell right panel 204R. In this embodiment, the footwell bottom panel 203, the footwell front panel 204F, the footwell rear panel 204RR, the footwell left panel 204L, and the footwell right panel 204R define the inner volume of the footwell 210. As shown in FIG. 11, the bottom floor 200 panels, front bottom panel 201 and rear bottom panel 202 are separated, at least partially, by the footwell inner volume 210. In order to bridge or cover the footwell inner volume 210 to provide a complete bottom of the wagon, an embodiment of the wagon may comprise a footwell cover 205. The footwell cover 205 may be connected to another portion of the wagon cover (as shown in FIG. 11) or be a separate component. In the embodiment shown in FIG. 11, the footwell cover 205 is connected to the bottom rear panel 202. In other embodiments, the footwell cover 205 may be connected to the front bottom panel 201, the footwell left panel 204L, and the footwell right panel 204R, the right side panel 144R, the left side panel 144L, or other panel or frame member of the wagon.

Figure 12:
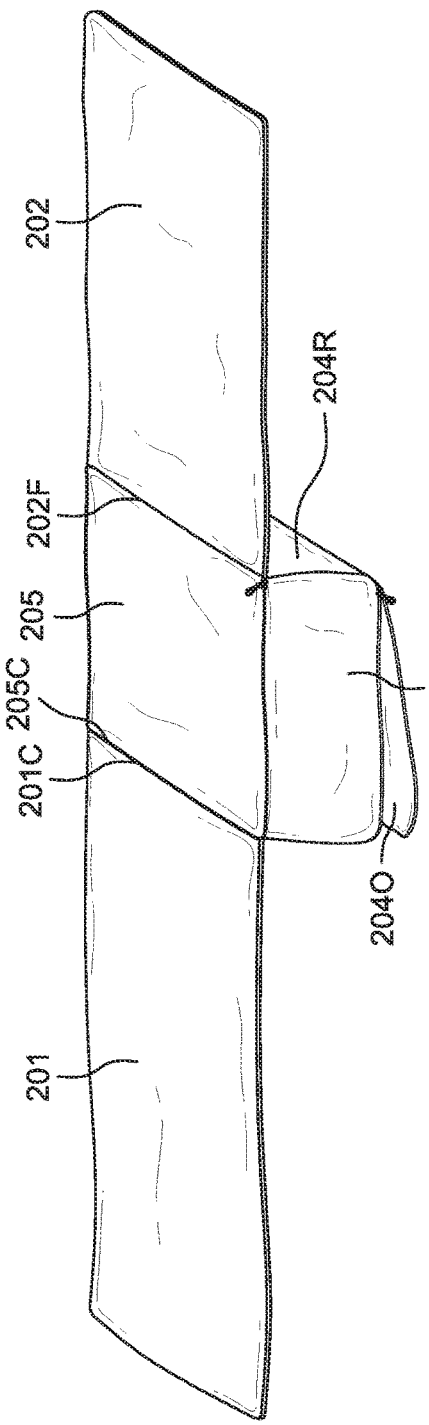
FIG. 12 depicts an embodiment of a footwell for a wagon for carrying at least one child that includes a reclosable opening that may be used to clean the footwell and wagon.

In the embodiment shown in FIG. 11, the footwell cover 205 is connected to rear bottom panel 202 at connection point 202F and may be folded from an footwell open position (shown in FIG. 11) to a footwell closed position (shown in FIG. 12). The footwell cover may be held in either footwell open position or the footwell closed position by at least one cover connector. The cover connector may be any type of connector including, but not limited to, velco, hook and loop connectors, zipper, zippers, hooks and eyes, toggle fasteners, buckles, snaps, buttons and buttonholes, hooks, and/or other fasteners. The connector on the footwell cover 205C may be a zipper that extends around the three sides of the footwell cover 205. The footwell cover 205 may be folded about fold portion 202F to a footwell closed position shown in FIG. 12. The connectors 201C and 205C may be fastened to retain the footwell cover 205 in the footwell closed position. As stated, the zipper shown in the figures is just an example of the connectors that may be used to retain the footwell cover 205 in the closed position.

In the embodiment shown in FIG. 11, the footwell fabric panels define a footwell opening 204O. The footwell opening 204O may be used to allow dirt, sand, or other debris to be easily removed from the footwell. The inner volume of the footwell may become dirty from dirt and debris on the shoes of the children sitting in the wagon for example. The footwell opening 204O may be used to drain the footwell of water when cleaning the wagon. In some embodiments, the footwell opening 204O may be defined by one or more of the fabric panels of the footwell. In the embodiment shown in FIG. 11, the footwell opening 204O is shown in the closed position. The footwell opening 204O is defined as a gap between the footwell bottom panel 203 and at least one of the footwell side panels 204F, 204L, 204R, and 204RR. The wagon may further comprise a footwell opening connector 204C that may be connected to retain the footwell opening 204O in a closed position (shown in FIG. 12) or opened to move the footwell opening to the opened position (shown in FIG. 11).

The footwell opening connector may be any reversible closing device such as, but not limited to, velco, hook and loop connectors, zipper, zippers, hooks and eyes, toggle fasteners, buckles, snaps, buttons and buttonholes, hooks, and/or other fasteners that can retain the footwell opening in a partially or fully closed position.

The invention claimed is:

1. A wagon, comprising:
    a folding frame, wherein the folding frame is configured to be folded from an expanded in-use configuration to a compact storage configuration for storage and unfolded from the storage configuration to the in-use configuration, the folding frame comprising:
        vertically oriented support frames comprising a right front support frame, a left front support frame, a right rear support frame, and a left rear support frame;
        a front upper horizontal support which extends between the right front support frame and the left front support frame, a rear upper horizontal support which extends between the right rear support frame and the left rear support frame, wherein the bottom frame is connected to the front and rear support frames; and
        a right side frame and a left side frame, each of the right side frame and the left side frame, comprising
            a front telescoping post, which is connected to at least one of the front support frames and the front bottom frame,
            a rear telescoping post, which is connected to at least one of the rear support frames and the rear bottom frame, and
            a scissor frame connection between the front telescoping post and the rear telescoping post,
    at least one reclining seatback frame, wherein the reclining seatback frame comprises at least one seatback frame being rotatably connected to at least one of the right front support frame, the left front support frame, the right front support frame, the left rear support frame, and the bottom frame, and
    a fabric cover supported over the frame, defining the wagon walls, floor, and reclining seatback frame.

2. The wagon of claim 1, comprising a front bottom frame and a rear bottom frame define a footwell aperture, and the wagon comprises a footwell support member which is connected at the bottom frame pivot axis at least one of the bottom frame, a portion of the scissor connections of the side frames, and the fabric cover defines a footwell of the wagon through the footwell aperture and over the footwell support.

3. The wagon of claim 1, wherein the wagon comprises at least one of a front bottom frame comprising a front seat support frame and a rear bottom frame comprising a rear seat support frame.

4. The wagon of claim 2, wherein a front lower horizontal support connects the two front support frames.

5. The wagon of claim 1, comprising a handle connected to at least one of the upper horizontal supports, any combination of two telescoping posts, and the front or rear support frames.

6. The wagon of claim 2, wherein the footwell support member is U-shaped.

7. The wagon of claim 1, comprising a plurality of attachment mechanisms attached to the frame.

* * * * *